(12) United States Patent
Banasiak et al.

(10) Patent No.: US 7,962,403 B2
(45) Date of Patent: Jun. 14, 2011

(54) METHOD AND APPARATUS FOR A MODEL ASSESSING DEBTOR BEHAVIOR

(75) Inventors: Michael J. Banasiak, Brielle, NJ (US); Daniel T. Tantum, Manalapan, NJ (US); Albert Fensterstock, Glen Cove, NY (US); Theodore R. Shalack, New Brunswick, NJ (US)

(73) Assignee: SunGard AvantGard LLC, Wayne, PA (US)

( * ) Notice: Subject to any disclaimer, the term of this patent is extended or adjusted under 35 U.S.C. 154(b) by 408 days.

(21) Appl. No.: 11/687,626

(22) Filed: Mar. 16, 2007

(65) Prior Publication Data

US 2007/0219885 A1 Sep. 20, 2007

Related U.S. Application Data

(60) Provisional application No. 60/782,934, filed on Mar. 16, 2006.

(51) Int. Cl.
*G06Q 40/00* (2006.01)

(52) U.S. Cl. .................. 705/38; 705/35; 705/39

(58) Field of Classification Search .................. 705/38
See application file for complete search history.

(56) References Cited

U.S. PATENT DOCUMENTS

| | | | | |
|---|---|---|---|---|
| 6,456,983 | B1 * | 9/2002 | Keyes et al. | 705/36 R |
| 6,654,727 | B2 * | 11/2003 | Tilton | 705/36 R |
| 2003/0078881 | A1 * | 4/2003 | Elliott et al. | 705/39 |
| 2007/0156554 | A1 * | 7/2007 | Nikoley et al. | 705/35 |
| 2007/0156557 | A1 * | 7/2007 | Shao et al. | 705/35 |

OTHER PUBLICATIONS

Estimating and pricing credit risk: An overview; Kao, Duen-Li; Financial Analyst Journal; V56n4 pp. 50-60; Jul./Aug. 2000.*
Experian and Predictive Metrics Introduce Small Business Lease Decision Score; PR Newswire (US) Apr. 14, 2003.*
Title Sharing Default as a Borrower Discipline Device; Padilla, A.J.; Pagano, M; Boston University—Industry Studies Programme, Boston, Boston Univerisity—Industry Studies Programme pp. 26; 1996.*

* cited by examiner

*Primary Examiner* — Hani Kazimi
*Assistant Examiner* — Michael D Cranford
(74) *Attorney, Agent, or Firm* — Patterson & Sheridan, LLP

(57) ABSTRACT

A computer implemented method for assessing different expected payment behavior of a debtor with respect to different creditors.

14 Claims, 4 Drawing Sheets

METHOD AND APPARATUS FOR A MODEL ASSESSING DEBTOR BEHAVIOR

CROSS REFERENCE TO RELATED APPLICATIONS

This application claims the benefit of U.S. Provisional Patent Application Ser. No. 60/782,934 filed Mar. 16, 2006 which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to forecasting systems that model payment behavior of debtors with respect to creditors.

BACKGROUND OF THE INVENTION

For some time companies have been using statistical-based modeling to assess the risk of payment inherent in doing business with potential and present customers. Typical of this methodology is the use of credit information gleaned from one of the major credit bureaus to assess whether an individual or business entity with whom the company is contemplating doing business has a record of appropriate payment. Thus, based on past history, an assessment of a future likelihood of appropriate slow or non-payment may be made. This past history may also include response to collections efforts and the like.

SUMMARY OF THE INVENTION

Various deficiencies in the prior art are addressed through the invention of a computer implemented method and apparatus for modeling the behavior of a debtor to enable determining a probability of a Credit and/or Collection Event ("CCE"), the financial consequences of which may then be evaluated. The CCE may be a debtor going into bankruptcy, an experience of a charge off with one or more creditors, a severe delinquency in meeting payment obligations and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
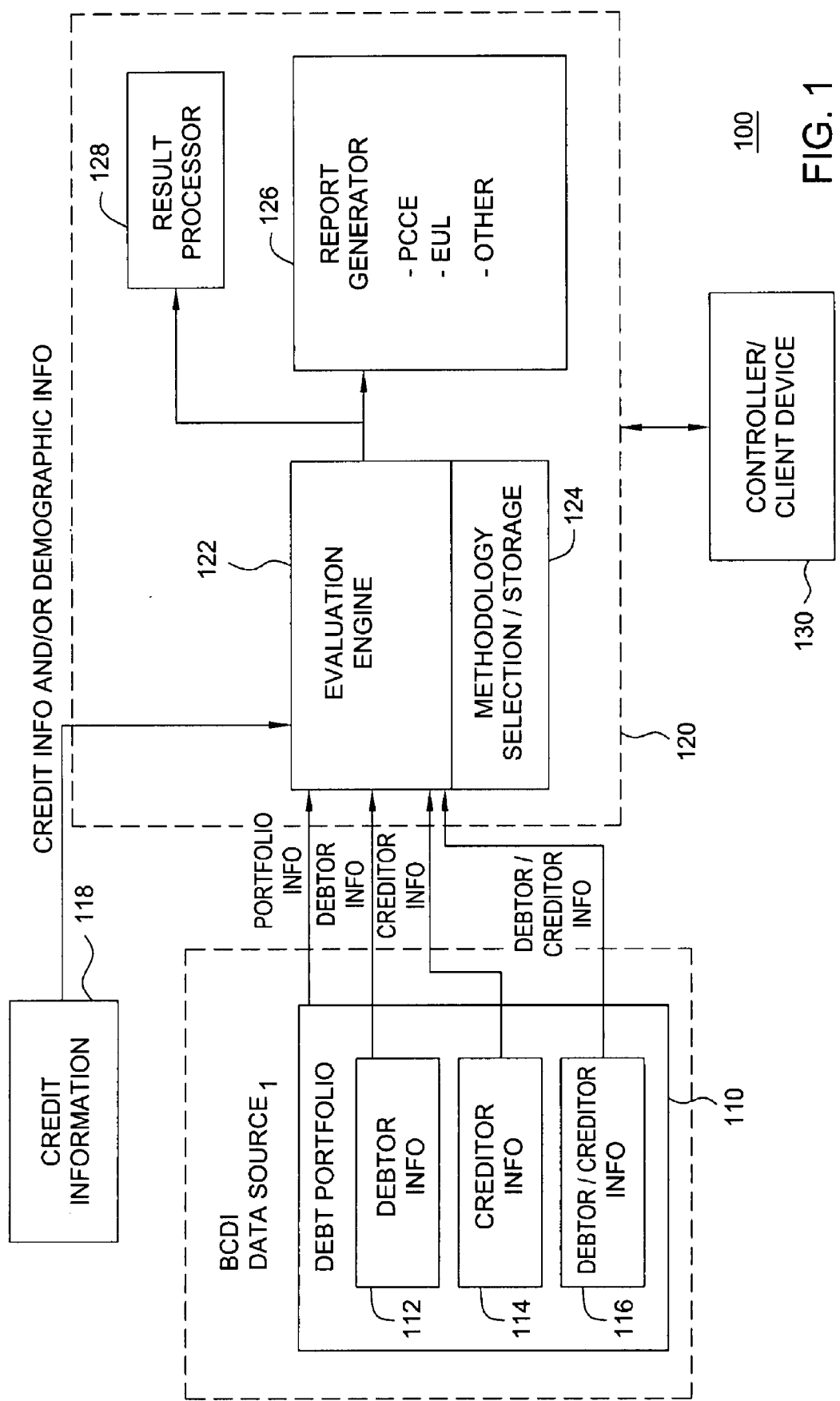
FIG. 1 depicts a high-level block diagram of a computer implemented apparatus according to an embodiment of the invention.

Business Credit Data Interchange ("BCDI") groups have been created to provide an information sharing mechanism. In the BCDI, companies share their respective accounts receivable performance data on their customers, and the BCDI management group manages and summarizes this data. The summarized data from the BCDI can be used to generate a Generic Creditor Model (see Equation 1 in section below) to assess the likelihood of a future Credit and/or Collection Event. Examples of a CCE are described in more detail below with respect to FIG. 2. The Probability of a Credit and/or Collection Event ("P(CCE)") of debtor (i) for creditor (j) takes the following functional form:

$$P(CCE_{i,J}) = F(BCDI_{i,J})$$

$$\text{Where } P(CCE_{i,J}) = P(CCE_{i1}) = P(CCE_{i2}) = \ldots P(CCE_{iM})$$

$$\text{And } BCDI_{i,J} = \Sigma BCDI_{ij} \text{ over all } j$$

The above equation is read as P(CCE) of debtor (i) with any creditor (j) is a function of the aggregated BCDI data elements ("$BCDI_{i,J}$") for debtor (i) across all M creditors in the BCDI. $P(CCE_{ij})$ uses J as the second subscript because P(CCE) does not vary by creditor. $P(CCE_{ij})$ means the P(CCE) of debtor (i) with respect to creditor (j). When the model is being built, the data elements are drawn from an archive consistent with the start of the performance period of the CCE. When the model is implemented, the data elements are captured at time of score. The use of the symbol $\Sigma$ in the term $\Sigma BCDI_{ij}$ is meant in the broader sense of aggregation rather than just a literal sum of data elements.

While this technique provides some indication of likely debtor actions, the technique is insufficiently accurate. Many debtors under this technique generate a low P(CCE) but still end up in a bankruptcy, nonpayment, slow payment or some other negative scenario. First and foremost the P(CCE) of debtor (i) does not differ by creditor. The P(CCE) is the same whether we are looking at a P(CCE) of debtor (i) for creditor (j) or creditor (k). However, the timeliness of debtor (i) in meeting its payment obligations can certainly differ by whether debtor (i) is making a payment decision for creditor (j) or creditor (k). Perhaps the debtor can pay one of these creditors on time but the other will be paid late (or not all). Second, the data relationships from the BCDI database to predict $P(CCE_{i,J})$ are aggregate relationships with no difference accounted for in the relationship of any data from creditor (j) to the $P(CCE_{i,J})$ for debtor (i). For example, creditor (j) may usually be paid on time or with slight delay while other creditors may consistently receive late payments or no payments. If creditor (j) incurs a late payment from debtor (i), this change in behavior may be more significant than the incurring of a late payment by one of the other creditors. Third, the financial consequences of the CCE are not readily apparent. Thus, the present BCDI P(CCE) technique is limited in what information it provides and what is provided does not adequately predict some very critical behaviors associated with debtors.

A variation of the technique described above assigns a score rather than a probability. It has the property that the score for debtor (i) with respect to creditor (j) is the same as the score with respect to creditor (k). This variation has additional limitations in that the P(CCE) is not readily apparent from the score and the determination of such a probability may be impossible or involve additional labor.

The typically summarized and/or aggregated data from the BCDI, in conjunction with data drawn from creditor (j), can be used to create Custom Creditor Models:

$$P(CCE_{ij})=F_j(BCDI_{i,j}) \text{ or}$$

$$P(CCE_{ij})=F_j(AR_{ij},APP_{ij},OTHER_i) \text{ or}$$

$$P(CCE_{ij})=F_j(BCDI_{i,j},AR_{ij},APP_{ij},OTHER_i)$$

These custom models are discussed in more detail below with respect to equations 3, 5 and 7.

The invention will be described within the context of a methodology for modeling debtor behavior to determine the P(CCE) for debtor (i) with creditor (j). That is, a probability that the debtor will fail to pay a particular creditor and, more specifically, that the debtor preferentially pays one creditor before another creditor. In this manner a creditor may manage the risk associated with future transactions with the debtor. A first application of the invention is the modeling of debtor behavior to determine the P(CCE). A second application of the invention is the modeling of debtor behavior to rank debtors according to a likelihood of repayment after one or more P(CCE)s, and to further rank the debtors according to the amount of payment likely to be received. Creditors are "owners" of consumer debt, commercial debt, medical/patient debt, leases, trade credit, revolving debt, installment debt, among others type of debt or, generally speaking, credit transactions.

Various embodiments of the invention provide a method for modeling debtor behavior, comprising: obtaining historic debtor data, creditor data, and debtor/creditor data found in "Business Credit Data Interchange" (BCDI) groups and/or possibly other data sources regarding debtor (i) outside of the BCDI; determining a $P(CCE_{ij})$ model by processing the historic debtor data, creditor data, and debtor/creditor data according to either of (1) a generalized linear modeling technique with a link function based upon a Generalized Beta of the Second Kind (GB2) family of distributions or (2) a generalized linear modeling technique using a link function based upon a member of the G-and-H family of distributions; and storing, in a memory, values corresponding to the $P(CCE_{ij})$.

One embodiment includes determining an expected conditional Utility Loss model by processing the historic debtor data, creditor data, and debtor/creditor data found in Business Credit Data Interchange ("BCDI") groups and/or possibly other data sources regarding debtor (i) outside of the BCDI according to either of (1) a generalized linear modeling technique using a member of the natural exponential family or (2) a maximum likelihood estimation fit to a member of the GB2; and storing, in the memory, values corresponding to the expected conditional Utility Loss model.

Another embodiment includes determining an Expected Utility Loss ("EUL") for debtor (i) with creditor (j) using the $P(CCE_{ij})$ and the expected conditional Utility Loss at time of $P(CCE_{ij})$ calculation.

A first algorithm ("Algorithm 1") associated with an embodiment of the evaluation engine utilizes a generalized linear modeling technique with a link function that is an inverse Cumulative Density Function from the Generalized Beta of the Second Kind family of distributions to provide a maximum likelihood estimation of the P(CCE) for debtor (i) with creditor (j) and generates thereby the first output data set. This four parameter distributional family includes logistic regression as a specialized form of this technique. Logistic regression usually works well, where working well refers to the maximum likelihood statistic of the model penalized for complexity with a criterion such as the Schwartz Bayes Criterion. The algorithm also examines link functions that are an inverse Cumulative Density Function from the G-and-H family of distributions. The G-and-H family (also a 4 parameter distributional family) includes probit regression as a specialized form of the technique. Probit regression usually works well (as defined above) within the G-and-H family, however, logistic regression is usually superior to probit regression in terms of the maximum likelihood statistic of the model. For this algorithm the dependent variable is dichotomous with 0 indicating non payment and 1 indicating payment. This algorithm uses credit history information from the second input data set for each debtor and applies the extracted information to the credit events of the respective debtors included within the BCDI. Thus credit and/or BCDI data determines a P(CCE) that is used to determine the relative credit worthiness of the debtors and to compare across creditors. The P(CCE) is used to rank the debtor population within the debtor portfolio and across creditors and provide thereby the first output score. Alternatively, one or more of a neural network processing technique, a linear regression technique, a discriminant analysis technique and a random forests technique as well as other techniques) may be used to generate the first output data set.

A second algorithm ("Algorithm 2") associated with an embodiment of the evaluation engine utilizes a general linear model to provide a maximum likelihood estimation of the Utility Loss conditional that a CCE has occurred. Alternatively a generalized linear modeling technique using a member of the natural exponential family such as Normal, Poisson, Gamma, Inverse Gaussian, Negative Binomial, Logarithmic, and Compound Poisson/Gamma and/or other distributions is used. The Gamma distribution usually works well (as defined above) within the natural exponential family; however, the general linear model regression is usually superior to this distribution in terms of the maximum likelihood statistic of the model. The model also fits distributions from the Generalized Beta of the Second Kind family of distributions using Maximum Likelihood Estimation. The Generalized Beta of the Second Kind family (a 4 parameter distributional family) includes Burr III, Weibull, Lognormal and Standard Beta distributions as specialized forms. The Standard Beta tends to work well (as defined above) within the Generalized Beta of the Second Kind family; however, the general linear model regression is usually superior to this distribution in terms of the maximum likelihood statistic of the model. For this algorithm the dependent variable is the Utility Loss conditional that a CCE has occurred. This algorithm uses credit history information from the second input data set for each debtor and applies the extracted information to the credit events of the respective debtors included within the BCDI. Alternatively, neural network techniques, discriminant analysis, random forests and other techniques may be used to generate an estimate for the sum of payments conditional that payments have been made.

For each debtor (i) and creditor (j) in the first dataset, the Expected Utility Loss is the product of the P(CCE) from the first algorithm with the above estimate for the conditional Utility Loss:

Expected Utility Loss(e.g., Dollars)=(Probability of CCE)×(Expected Conditional Utility Loss).

Software instructions defining a method for modeling debtor behavior according to the invention may be implemented by a computer or stored on a computer readable medium, wherein the method comprises obtaining historic customer placement data for each of at least one debtor in a debt portfolio; obtaining historic credit data for each of the at least one debtor in the debt portfolio; determining a P(CCE) model by processing the historic customer placement data and historic credit data according to either of (1) a generalized linear modeling technique with a link function based upon a Generalized Beta of the Second Kind (GB2) family of distributions or (2) a generalized linear modeling technique using a link function based upon a member of the G-and-H family of distributions; and storing, in a memory, values corresponding to the P(CCE) model.

Thus credit and/or placement data determines an EUL that is used to determine the relative credit worthiness of the debtors and to compare across creditors. The EUL is used to rank the debtor population within the debtor portfolio and across creditors and provide thereby the second output score.

Alternatively, the EUL is estimated directly by applying a combination of the first and second algorithms to the dependent variable Utility Loss (rather than the conditional Utility Loss). Such a procedure applies these algorithms in the context of a Tobit model with significant censorship at 0. That is, the EUL may also be directly estimated using a Tobit model with or without the P(CCE) model (as discussed herein) as an input to the Tobit model.

There are numerous uses for the $P(CCE_{ij})$s and/or EULs and comparisons information provided according to the invention including:

1. Creditors can use this release orders with existing customers or mitigate its risk before releasing such order.
2. Creditors can manage credit line by increasing low risk customers and decreasing high risk customers.
3. Prioritization of risk based collection activities based on the probabilities of delinquency.
4. Creditors can use the probabilities to change the contractual terms of the lending relationship in regards to interest rates, fees, period of payment, and length of contract term, among other provisions.

In addition to the above, new business credit decisions can be made examining the individual scores by creditor or average across creditors. For example, suppose the average score of a debtor is 84 (where higher is better) in a BCDI composed of 4 creditors: 78 for creditor 1, 80 for creditor 2, 82 for creditor 3, and 96 for creditor 4 (the use of a simple average is for demonstration. Other types of averages, such as balance weighted, may be used if appropriate).

Generally speaking, the present invention utilizes a database and statistical model specification that determines the following:

(1) Probability of a CCE ("$P(CCE_{ij})$") for debtor (i) with specific creditor (j); (2) The expected utility loss of a CCE for debtor (i) with specific creditor (j), and (3) a ranking of creditors in the BCDI associated (or potentially associated) with the debtor according to likelihood of payment.

For a possible CCE, the event probability is bounded by a confidence interval determined by the standard error of that CCE. The CCE probability along with trend data associated with the CCE is used to provide an estimation of the range and trend of the CCE. In various embodiments of the invention, reports are generated to facilitate the presentation of the results generated using the invention.

One embodiment of the invention comprises a method for modeling the $P(CCE_{ij})$ behavior of a debtor (i) with respect to a creditor (j), the method comprising aggregating debtor account receivable or payment data from each of a plurality of creditors, and using the aggregated debtor account receivable or payment data and debtor payment data from the creditor (j) to determine $P(CCE_{ij})$. That is, the creditor (j) models the behavior of a debtor using aggregated data from other creditors associated with the debtor as well as the creditor's own data associated with the debtor. The general functional form is as follows:

$$P(CCE_{ij})=F(AR_{ij},APP_{ij},OTHER_i,BCDI_{i1},BCDI_{i2}\ldots,BCDI_{iM},BCDI_{i,j})$$

The above equation is read as P(CCE) for debtor (i) with creditor (j), is a function of account receivable, AR, data for debtor (i) with creditor (j), other optional internal data, APP, for debtor (i) with creditor (j), other optional third party data, OTHER, providing more information on debtor (i), groups of data elements specifically tied to each creditor in the BCDI, and the aggregated BCDI data elements ("$BCDI_{i,j}$") for debtor (i) across all M creditors in the BCDI.

Based upon this functional form the $P(CCE_{ij})$ is determined by data relationships specifically between debtor (i) and creditor (j) as well as data relationships between debtor (i) and other creditors. This ability to allow the data relationships to differ by creditor, all else equal, can only increase the accuracy of $P(CCE_{ij})$.

Prior art generally uses a summarized BCDI database. The above form goes beyond using summarized and/or aggregated data because the data elements are identified according to the creditor from which they originated.

Comparisons across creditors use a specialized functional form:

$$P(CCE_{ij})=F(OTHER_i,BCDI_{i1},BCDI_{i2},\ldots,BCDI_{iM},BCDI_{i,j}),$$

Alternatively, $P(CCE_{ij})=F(BCDI_{ij}. OTHER_i, BCDI_{i1}, BCDI_{i2}, \ldots BCDI_{iM}, BCDI_{i,j})$, where the term for creditor (j) is listed first and only once. This functional form includes AR and APP only to the extent that this data is shared in the BCDI. This functional form enables the reporting to creditor (j) of the P(CCE) for debtor (i) with creditor (j) and also the $P(CCE_{ij})$ for all other J−1 creditors, the average P(CCE) across creditors and so on. In this way creditor (j) can accurately know the P(CCE) of debtor (i) with creditor (j), and also the payment risk of debtor (i) with others. Note that the $P(CCE_{ij})$ from the first form could differ from the second form if creditor (j) has proprietary data that affect the probability of a CCE. Because members of a BCDI are usually encouraged and/or required to share meaningful credit data, the specialized functional form is typically used. Thus, the specialized form will be assumed without loss of generality throughout this patent application.

The expected utility loss of a CCE for debtor (i) with specific creditor (j) can be used to evaluate the financial consequences of a CCE:

$$EUL_{ij}=P(CCE_{ij})*UL_{ij}$$

The above equation is read as Expected Utility Loss ("EUL") is the product of the P(CCE) for debtor (i) with creditor (j) and expected conditional Utility Loss ("UL") for creditor (j) of that CCE with debtor (i). The UL is a function of variables, such as balance outstanding, and may include monetary costs associated with the incurring of a CCE, such as collection efforts. The UL may also include non monetary or intangible considerations such as distraction of management time or investor loss of confidence in the management of creditor (j). Relevant collateral may be considered as a reduction to the UL.

For example, if the CCE is 30 day delinquency and the UL is writeoff dollars, then UL=k*(amount of delinquency) is a type of UL function, where k is the average proportion of resulting writeoff dollars to 30 day delinquency dollars.

A particularly useful form of EUL is referred to as Payment At Risk ("PAR"):

$$PAR_{ij} = P(CCE_{ij}) * Balance_{ij}$$

The above equation is read as PAR is the product of the Probability of a CCE for debtor (i) with creditor (j) and the balance outstanding as shown in the BCDI at time of estimation of $P(CCE_{ij})$. This form has the form of a weighted delinquency measure where the weights reflect the financial size of the relationship between debtor (i) and creditor (j). The balance outstanding is usually the sum of the missed payments from debtor (i) to creditor (j) but it could also include any remaining contractual payments (for example, missed lease payments as well as the remaining lease payments).

Because PAR is particularly useful and simple, PAR will be used in place of EUL without loss of generality throughout this patent application. Dollars At Risk ("DAR") is synonymous with PAR and is usually used for dollar based entities.

The above UL examples are special cases of the more general situation where the UL outcome is modeled using the algorithms discussed below. For example, if the CCE is 30 day delinquency and the UL is writeoff dollars (for example, 180 day delinquency), the process would perform bivariate analysis to build a model for writeoff dollars conditional upon the occurrence of a 30 day delinquency.

A ranking of creditors in the BCDI associated with the debtor according to likelihood of payment follows naturally from the calculation of $P(CCE_{ij})$. Potential creditors that are members of the BCDI can evaluate their potential ranking in the list of creditors by evaluating the $P(CCE_{ij})$ of the proposed relationship in the context of the existing relationships of debtor (i). Such rankings can be determined conditionally based upon the occurrence of one or more $P(CCE_{ij})$ involving one or more creditors. A ranking of creditors can also be done according to EUL or PAR.

Thus, generally speaking, the invention helps determine a likelihood of payment not being made in a timely manner by debtor (i) with creditor (j), and the amount of payment under risk, as well as payments not being made in a timely manner with other creditors. Such information has many important uses, some but not all uses are:

Deciding to release incremental orders to customers
Adjusting (increase/decrease) Credit Lines
Prioritizing the work of collectors
Optimizing terms of contract; days payment due, interest, length of contract
Soliciting business from new customers The invention uses historical data found in the BCDI and creates algorithms for $P(CCE_{ij})$. The algorithms are stored in memory and subsequently may be used to process current and historical data found in the BCDI to update $P(CCE_{ij})$. The historical data and algorithms are discussed below.

FIG. 1 depicts a high-level block diagram of functional elements associated with an embodiment of the invention. Specifically, FIG. 1 depicts a BCDI Data Source, illustratively a debtor/creditor portfolio 110 including debtor information 112 and/or creditor information 114 and/or debtor/creditor information 116 (i.e., information that links the debtor/creditor transactions) that provides portfolio information, debtor information, creditor information, and debtor/creditor information to an evaluation system 120. This information comprises a first data set for processing by the evaluation system 120. Additionally, a Credit Information Data Source 118 provides a second data set for processing by the evaluation system 120. The Credit Information Data Source 118 comprises, illustratively, a commercial or private source of credit information pertaining to each debtor in the Customer Placement Data Source 110. Other databases (not shown) such as demographic databases may be used to provide information to the evaluation system 120, as discussed below.

The evaluation system 120 comprises an evaluation engine 122 which processes the two received data sets according to, illustratively, any of a plurality of algorithms provided by a methodology selection storage unit 124. The output of the evaluation engine 122 is provided to a report generator 126 for providing a machine readable or human readable report. Several exemplary reports will be discussed below with respect to FIG. 5. Optionally, a result processor 128 performs further processing of the evaluation engine output to derive additional information, such as comparisons of a present portfolio, debtor, creditor, or debtor/creditor to a previously processed portfolio, debtor, creditor, or debtor/creditor.

The evaluation system 120 is depicted in FIG. 1 as being controlled by a controller/client device 130, illustratively a general purpose computer. The controller 130 operates to, illustratively, cause specific algorithms to be selected by the evaluation engine, cause specific reports to be generated by the report generator 126, cause specific post-processing operations to be performed by the result processor 128 and so on. The controller 130 operates to receive information from any of the functional elements depicted in FIG. 1.

Each of the functional elements depicted in FIG. 1 may be implemented as one or more computing devices such as, for example, described in more detail below with respect to FIG. 4. Generally speaking, the functional elements of FIG. 1 may be combined in any way within the context of one or more general purpose or special computing devices to implements the various functions associated with the present invention, as described herein.

While generally described as processing BCDI data in combination with Credit Information Data data, various embodiments of the invention are implemented by processing one of both of BCDI data and Credit Information Data data. Moreover, demographic data and other data may also be processed in combination with either or both of the customer placement data and credit history data.

The evaluation engine 122 is adapted to evaluate a portfolio of debtors or an individual debtor. A debt portfolio typically comprises accounts receivable (A/R) that have been deemed by one or more creditors to be uncollectible or not worth collecting because the accounts have reached a status of severe delinquency status or write-off. Debt portfolios comprised of slightly delinquent accounts or even current accounts can be evaluated as well. Debt portfolios may be produced by, for example, a company or group of companies that would like to get some return on their uncollected A/R but may not have the in-house collections expertise to generate a sufficient return. Alternatively, a company may use portfolio sales to manage their balance sheet. The portfolio is offered for sale to a debt buyer, typically at a discount to the face value of the uncollected A/R. The debt buyer should estimate the value of the portfolio. More specifically, the debt buyer should estimate how much of the uncollected A/R may be ultimately collected and the likely cost to the debt buyer of realizing those collections.

Modeling Debtor Behavior Before a Credit or Collection Event

A first application of the invention is the modeling of debtor behavior to determine the P(CCE) and/or EUL for debtor (i) with creditor (j).

Business Credit Data Interchange ("BCDI") groups have been created to provide an information sharing mechanism between creditors. In the BCDI, companies share their accounts receivable performance data on their customers and the BCDI management group will manage and summarize such data. BCDI data within the context of the present invention comprises one or more variables such as those presented in the below list. It is noted that some of the variables are historic in nature and some are present observations.

BCDI Variables

The following is a non-exclusive listing of BCDI variables that may be used in algorithms according various embodiments of the invention:
1. Total Outstanding Balance across creditors;
2. Total Credit Line across creditors;
3. Amount current across creditors;
4. Amount 1-30 days past due across creditors;
5. Amount 31-60 days past due across creditors;
6. Amount 61-90 days past due across creditors;
7. Amount 91-120 days past due across creditors;
8. Amount 121-150 days past due across creditors;
9. Amount 151-180 days past due across creditors;
10. Amount 181-210 days past due across creditors, etc;
11. Amount of write-off (loss) across creditors;
12. Amount placed for collection across creditors;
13. Average days past due across creditors;
14. Original (first) trade credit/lease/loan amount across creditors;
15. Unapplied cash amount across creditors;
16. Late-fee amount charged across creditors;
17. NSF check amount or indicator across creditors;
18. Indicator or date of bankruptcy across creditors;
19. Placed for collection amount across creditors;
20. Term of trade credit/lease/loan across creditors;
21. Date of first lease/loan across creditors; and
22. Tenure in months or date became customer across creditors.

In addition to the above, combinations of variables, analyses across time, ratios, logs, truncations, censoring, minimums, maximums and differences among other transformations are appropriate to use in various embodiments of the invention. For example, the BCDI variables optionally include (or are associated with) demographic values pertaining to debtors.

Accounts Receivable Variables

The following is a non-exclusive listing of accounts receivable variables that may be used in algorithms according various embodiments of the invention:
1. Total Outstanding Balance;
2. Total Credit Line;
3. Amount current;
4. Amount 1-30 days past due;
5. Amount 31-60 days past due;
6. Amount 61-90 days past due;
7. Amount 91-120 days past due;
8. Amount 121-150 days past due;
9. Amount 151-180 days past due;
10. Amount 181-210 days past due, etc.;
11. Amount of write-off;
12. Amount placed for collection;
13. Average days past due;
14. Original (first) trade credit/lease/loan amount;
15. Unapplied cash amount;
16. Late-fee amount charged;
17. NSF check amount or indicator;
18. Indicator or date of bankruptcy;
19. Placed for collection amount;
20. Term of trade credit/lease/loan;
21. Date of first lease/loan; and
22. Tenure in months or date became customer.

In addition to the above, combinations of variables, analyses across time, ratios, logs, truncations, censoring, variances, averages, measures of volatilities, minimums, maximums, differences among other transformations and statistical calculations are appropriate to use in various embodiments of the invention.

With respect to the above variable sets, bureau data, demographic data and other third party data may be used. Such data is usually supplied through layouts specified by the source entity.

The following are three applications of credit or collection score methodologies that can be applied to one or both of the above data variable sets:

I. Generic Creditor Model:

For the Generic Creditor Model ("GCM"), P(CCE) for debtor (i) with creditor (j) takes the following functional form:

$$P(CCE_{ij}) = F(BCDI_{ij}) \quad \text{(equation 1)}$$

$$\text{Where } P(CCE_{i,J}) = P(CCE_{i1}) = P(CCE_{i2}) = \ldots P(CCE_{iM})$$

$$\text{And } BCDI_{i,J} = \Sigma BCDI_{ij} \text{ over all } j$$

$$PAR_{i,J} = P(CCE_{i,J}) \quad \text{(equation 2)}$$

The above equation 1 is read as the P(CCE) for debtor (i) with any creditor (j) is a function of the aggregated BCDI data elements ("$BCDI_{i,J}$") for debtor (i) across all M creditors in the BCDI. $P(CCE_{i,J})$ uses J as the second subscript because P(CCE) does not vary by creditor. $P(CCE_{ij})$ means the P(CCE) of debtor (i) with respect to creditor (j). The generic creditor model P(CCE) for debtor (i) does not differ by what creditor is being provided the P(CCE). The above equation 2 is read as PAR is the Probability of a CCE for debtor (i) with any creditor (j). Note that the generic creditor model does not evaluate the possibly differing financial consequences of a CCE by creditor.

II. Custom Creditor Model:

The GCM can be customized to an individual creditor (j) to create a Custom Creditor Model ("CCM"). The creditor creates the model and applies the model. The details and results of the model are not communicated to other creditors. Typically the creditor (j) receives data from a BCDI and uses the data in conjunction with its own internal data and/or data from third party sources. If the creditor participates in the BCDI some or all of the internal data may be included as part of the aggregated BCDI data elements. Upon request the BCDI may provide aggregated BCDI data elements such that data from the creditor is not part of the aggregated BCDI data elements. Removal of the creditor (j) data from the aggregated BCDI data elements is preferred but not necessary.

Thus, in one embodiment of the invention, each of a plurality of groups within a single BCDI (or plurality of groups associated with respective BCDIs) provides a data set to a creditor. The creditor is a member of each of the BCDI groups. The creditor utilizes its own custom creditor model to process the multiple BCDI group data sets to determine a P(CCE) for a particular debtor with respect to the creditor, to determine a P(CCE) for the particular debtor with respect to one or more other creditors, and/or to determine a likely order or sequence of CCEs that the debtor will impose upon the creditors. The sequence of CCEs may be determined by ranking, in order of likelihood, the P(CCE) for the particular debtor with respect to each of the one or more creditors.

An important change from the GCM is that data from creditor (j) with respect to debtor (i) is now specifically identified as coming from creditor (j) rather than just being part of the aggregate data elements. Another change is that the CCE (the dependent variable) is calculated using data from creditor (j) although a hybrid dependent variable that combines creditor data with BCDI aggregate data elements and/or a third party data source may also be used. For example, 91+ day delinquency with creditor (j) or a severe delinquency in the BCDI or a bankruptcy filing recorded by a bureau.

In the CCM models that follow it is understood that creditor (j) typically performs calculations only for itself, i.e., j is the only creditor for whom the model is built and the results computed. The values of the aggregated BCDI data elements are known but the creditor of origin for a particular transaction is not known. Each member of the BCDI may develop its own unique model but these development efforts are not shared. Typically the BCDI is not involved with the calculation of $P(CCE_{ij})$.

In the CCM, the P(CCE) of debtor (i) for creditor (j) takes the following functional forms:

A. CCM using BCDI data only:

$$P(CCE_{ij})=F_j(BCDI_{i,j}) \quad \text{(equation 3)}$$

$$PAR_{ij}=P(CCE_{ij}) \quad \text{(equation 4)}$$

The above equation 3 is read as P(CCE) for debtor (i) with the creditor (j) is a function of the aggregated BCDI data elements ("$BCDI_{i,j}$") for debtor (i) across all M creditors in the BCDI. The above equation 4 is read as PAR is the Probability of a CCE for debtor (i) with the creditor (j). Note that CCM does not evaluate the financial consequences of a CCE.

This form uses the same aggregated BCDI data elements as the GCM, however, the prediction function $F_j$ is specific to the creditor (j). For example, the prediction function could be a result of using the aggregated BCDI data elements to predict a CCE (the dependent variable in the modeling process) based upon performance data from the creditor (j).

B. CCM using the creditor's internal accounts receivable and other data only:

$$P(CCE_{ij})=F_j(AR_{ij},APP_{ij},OTHER_i) \quad \text{(equation 5)}$$

$$PAR_{ij}=P(CCE_{ij}) \quad \text{(equation 6)}$$

The above equation 5 is read as P(CCE) for debtor (i) with the creditor (j) is a function of accounts receivable data ("AR") for debtor (i) with the creditor (j) other optional internal data ("APP") for debtor (i) with creditor j and other optional third party data ("OTHER") providing more information on debtor (i). The above equation 6 is read as PAR is the Probability of a CCE for debtor (i) with the creditor (j). An example of OTHER data is data from a credit bureau, a demographic data source, a private data source and the like. Although the $AR_{ij}$ may be composed of data that is sent to the BCDI, the source of the $AR_{ij}$ is the creditor (j).

C. CCM using the creditor's internal accounts receivable, other data, and with BCDI data only:

$$P(CCE_{ij})=F_j(BCDI_{i,j},AR_{ij},APP_{ij},OTHER_i) \quad \text{(equation 7)}$$

$$PAR_{ij}=P(CCE_{ij}) \quad \text{(equation 8)}$$

The above equation 7 is read as P(CCE) for debtor (i) with the creditor (j), is a function of the aggregated BCDI data elements ("$BCDI_{i,j}$") for debtor (i) across all M creditors in the BCDI, AR data for debtor (i) with the creditor (j), APP data for debtor (i) with creditor (j), and OTHER data on debtor (i). The above equation 8 is read as PAR is the Probability of a CCE for debtor (i) with the creditor (j). Although the $AR_{ij}$ may be composed of data that is sent to the BCDI, the source of the $AR_{ij}$ is the creditor (j).

III. Business Credit Data Interchange Score:

In one embodiment of the invention, the BCDI score provides a functional form that scores by debtor (i) and creditor (j), using the creditors' own data as members of the BCDI in conjunction with the aggregated BCDI data elements ("$BCDI_{ij}$"), in the following form:

$$P(CCE_{ij})=F(OTHER_i,BCDI_{i1},BCDI_{i2},\ldots,BCDI_{iM},BCDI_{i,j}) \quad \text{(equation 9)}$$

Alternatively, $P(CCE_{ij})=F(BCDI_{ij},OTHER_i,BCDI_{i1},BCDI_{i2},\ldots BCDI_{iM},BCDI_{i,j})$, (equation 10)

where the term for creditor (j) is listed first and only once.

$$PAR_{ij}=P(CCE_{ij})*Balance_{ij} \quad \text{(equation 11)}$$

The above equations 9/10 are read as Probability of a CCE for debtor (i) with creditor (j) is function of data contained in BCDI covering debtor (i) with creditor (j), other optional third party data, OTHER, providing more information on debtor (i) and data elements for debtor (i) across all j creditors in the BCDI. The above equation 11 is read as PAR is the product of the Probability of a CCE for debtor (i) with creditor (j) and the balance outstanding as shown in the BCDI at time of estimation of $P(CCE_{ij})$.

Thus the BCDI score allows a time series cross sectional model across a matrix of creditors and debtors. Based upon this functional form, calculations are made for the P(CCE) for debtor (i) for the creditor (j) and report to creditor k) the P(CCE) for all other j−1 creditors, the average P(CCE) across creditors and so on.

Figure 2:
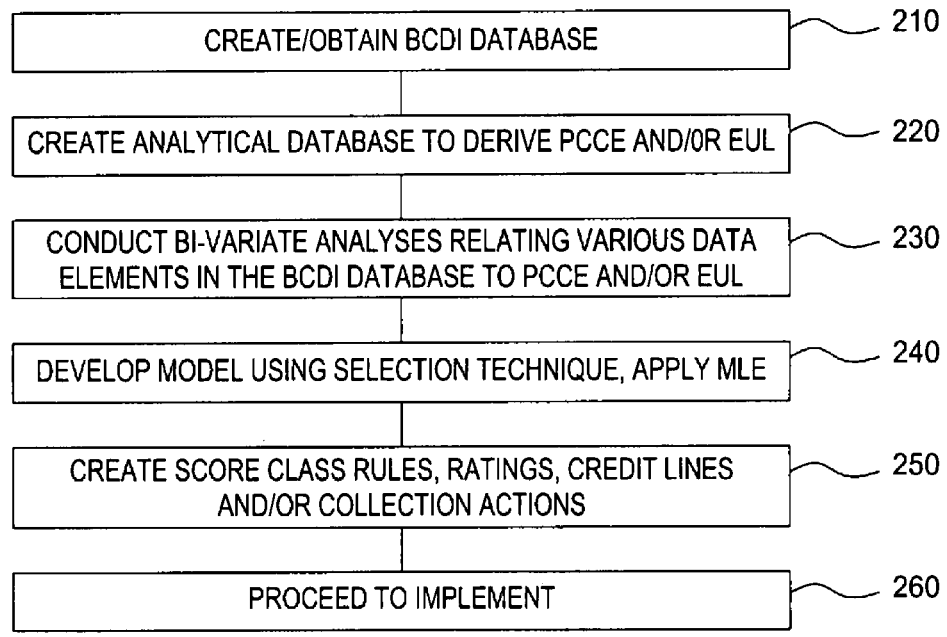
FIG. 2 depicts a flow diagram of a method for developing a business credit data interchange (BCDI) score.

FIG. 2 depicts a flow diagram of a method for developing a Business Credit Data Interchange (BCDI) score.

At step 210, a BCDI database is obtained or created. That is, the method operates to create or obtain a BCDI, as defined above that provides AR information where creditor and debtor relationships can be identified. The BCDI database is a compilation of empirically observed historical or archived creditor and debtor data.

At step 220, an analytic database is created to derive a P(CCE) and/or EUL. That is, using the BDCI database, the method creates an analytical database that allows the calculation of the P(CCE) and/or EUL. Data elements are stored in a manner to allow identification of the debtor/creditor relationship and debtor relationship across all creditors in a BCDI. Some examples of P(CCE)s and EULs are:

a) The probability of a debtor obtaining a 91+ day past due delinquency, write-off, or be placed for collection in the six month period after scoring;

b) The probability of a debtor obtaining a 10% of the outstanding balance is 120+ day past due delinquency, write-off, or be placed for collection in the eighteen month period after scoring;

c) The probability of collecting or recovering balances any past due balances within a three month period after scoring;
d) The probability of a write-off within six months of scoring; and
e) The probability of moving to the next aging category the month after scoring.
f) The expected writeoff dollars for a debtor when the CCE is the occurrence of a 30+ day past due delinquency
g) The expected dollar loss for a debtor when the CCE is the occurrence of a 91+ day past due delinquency and the accounts are sold to a collection agency at day 210.

At step 230, a bivariate analysis relating various data elements in the BCDI database to the P(CCE) and/or EUL is performed. The bivariate analysis technique is discussed in more detail below. Specifically, the method conducts a bivariate statistical analysis upon the AR data elements found in the BCDI database and may apply transformations to create predictive variables. Such transformations entail, illustratively, logs, truncations, censoring, variances, averages, measures of volatilities, compound variables, missing variable assignments and the creation of dichotomous variables among other transformations and other statistical calculations.

At step 240, a model is developed using a selection technique, and a maximum likelihood estimation (MLE) is applied. That is, the method finds the most predictive set of variables using a stepwise, forward, backward or another selection technique.

At step 250, one or more of score class rules, ratings, credit lines and collection actions are created. That is, the method uses the probabilities and expected values from the MLE (or other technique) to apply a heuristic or statistical method to group P(CCE) and/or EUL into Score Classes, Ratings, Credit Lines and/or collection actions.

At step 260, BCDI score is ready for implementation. That is, the method has processed the BCDI score such that the algorithm with the empirically derived weights and with Score Class rules, Ratings, Credit Lines and/or collection actions can be applied and implemented.

At step 240, a multivariate debtor payment behavior model is developed by processing all candidate variables in association with the dependent variables according to a selection technique. The set of candidate variables is expanded to include interactive effects between variables, for example, if A and B are candidate variables then A*B would also be processed. That is, the most predictive set of variables is found using a stepwise selection technique with a complexity penalty, such as the Schwartz Bayes Criterion. The significance level of the selection criteria is typically set at the 99% significance level, but the 95% level and other levels can be used with small samples. Alternatively a forward, backward or another selection technique can be used. For each variable, the sign of the coefficient is tested against the correlation of that variable with the dependent variable as an additional check for significance and also to discourage unnecessary co linearity in the model.

Also at step 240, a Maximum Likelihood Estimation (MLE) and General Linear Estimation Technique is employed to process the analytical database provided at step 220. Specifically, an MLE using the Logistic Regression form of the GB2 is used to create the P(CCE) model. It is noted that the inventors have found that Logistic Regression, as a member of the family of statistical distributions of Generalized Beta of the Second Kind ("GB2"), is relatively straightforward to compute, that the direction of the estimated parameters can be understood and that the technique is well suited for problems with dichotomous dependant variables, such as made payment versus no payment. However, the inventors also contemplate that other statistical distributions can be used to derive the MLE though these may be computationally burdensome without providing any significant increase in predictive power. Furthermore, while other techniques such as Neural Networks and Genetic Algorithms (among others) can be used, these may disadvantageously make the function computationally difficult to calculate and, therefore, it may be difficult to determine the direction of the estimated parameters. Generally, linear regression is not used due to the inherent unequal variance associated with the error structure of a dichotomous dependent variable. See the above discussion for Algorithm 1 for more details.

Also at step 240, a Generalized Linear Modeling Technique is employed using a normal distribution to estimate the EUL Model. Here the estimated P(CCE) is an independent variable along with the Candidate Variables found to be predictive of the EUL. It is noted that the inventors have found that Generalized Linear Modeling, as a member of the natural exponential family of statistical distributions, is relatively straightforward to compute, that the direction of the estimated parameters can be understood and that the technique is well suited for problems with positive continuous dependent variables, such as made payment versus no payment. However, the inventors also contemplate that other statistical distributions, such as members of the GB2 family, can be used to derive the MLE though these may be computationally burdensome without providing any significant increase in predictive power. Furthermore, while other techniques such as Neural Networks and Genetic Algorithms (among others) can be used, these may disadvantageously make the function computationally difficult to calculate and, therefore, it may be difficult to determine the direction of the estimated parameters. See the above discussion for Algorithm 2 for more details.

An MLE technique, illustratively a Logistic Regression, Linear Regression or some other technique to derive the P(CCE) algorithm of step 120 is applied. The inventors have determined that Logistic Regression is relatively easy to compute, the direction of the estimated parameters can be understood and the technique is well suited for problems with dichotomous dependant variable. However, other statistical distributions can used to derive the MLE, but may be computationally burdensome without any increase in predictive power. Furthermore, other techniques such as Neural Networks and Genetic Algorithms (among others) may be used, though such techniques may make the function computationally difficult to calculate and make the determination of the direction of the estimated parameters difficult. Generally, linear regression is not used due to the inherent unequal variance associated with a dichotomous dependent variable.

Bivariate Analysis

The invention uses a sample of historical debtor data, creditor data, debtor/creditor data and/or other data to be used as independent variables to develop a model that predicts the P(CCE) (e.g., 30 day delinquency) and EUL (e.g., expected writeoff dollars). The model is then stored in memory for subsequent use in processing current debtor data, creditor data, debtor/creditor data and/or other data to predict current debtor behavior. The model may be debtor or account type specific to increase the correlation between the historic data driven model and the current data prediction.

Specifically, the invention creates a set of variables for bivariate analysis ("analysis variables") for a debtor payment behavior model from a set of historical data elements that are old enough to observe the dependent variable. The data elements fall into two broad types: numerical and categorical.

Some data elements may be considered a mixture of these types and hence are analyzed using a mixture of the methodologies described herein. If a categorical data element has any categories with a numerical value, an additional data element is constructed by treating each numerical category as a number and the other categories as missing values. The date of observation is always a data element.

The analysis variable creation process is performed, illustratively, four times, since conducting all of the desired transformations and mathematical operations in one processing step may be computationally burdensome; however, it may be desirable in some environments to do this in one step.

The data elements for the first iteration of the analysis variable creation process come from the data request(s) shown later in this patent application. The analysis variables created from the first iteration through the set of data elements become the data elements for the second iteration, etc. Analysis variables that would first arise from the last iteration (illustratively the fourth iteration) are "frontier variables". If any candidate variables (described below) based upon frontier variables make the model cut described in step 240 then the entire process will be repeated for a fifth time and a new set of frontier variables will be defined. Additional repeats may be necessary until the process ceases to generate variables that make the model cut using a complexity criteria described below Every data element becomes an analysis variable. Additional analysis variables are created from numerical or categorical data elements and may involve transformations such as logarithms and exponentiation as well as other mathematical transformations. Another type of transformation involves the breakdown of a data element into component analysis variables. For example, the Date of first lease/loan across creditors creates three component variables: year of first lease/loan, month of first lease/loan, and day of first lease/loan. Yet another type of transformation involves categorization of a data element based upon additional information and/or databases. For example, the SIC code for a commercial debtor would be compared with a list of SIC industry groups to create an analysis variable that indicates membership in certain groups.

Analysis variables may also be based upon relationships among data elements. Mathematical operations, such as addition, subtraction, multiplication, division, equalities, and inequalities are used to generate new analysis variables from each pair of numerical data elements. Equalities and inequalities can be applied to pairs of categorical data elements as well as mixed pairs.

Analysis variables are also created from groups of data elements. Mathematical functions such as sums, variances, averages and measures of volatilities as well as other statistical calculations are applied to groups of numerical data elements. For each group a family of count variables is constructed by counting the number of instances a particular value occurs in that group. Count variables can be constructed for groups of categorical data elements.

When available, a time series may be constructed and analysis variables created from its elements using variances, averages and measures of volatilities as well as other statistical calculations. The time series would also be considered as a group (described above).

After the set of analysis variables has been created, the invention creates variables for use as candidates in step 240 ("candidate variables"). All candidate variables must take only numerical values. Every numerical analysis variable generates one, possibly several, candidate variables. Missing values will be assigned a numeric value using the average of the variable for non missing values. Additional techniques for missing data include an inversion of the linear regression line for the dependent variable verses the analysis variable, where the inversion is calculated for the average of the dependent when the analysis variable is missing. An alternate technique comprises an imputation of value based upon statistical relationships of the analysis variable to other analysis variable(s), for example the assignment of a missing writeoff date as 180 days after a known last payment date.

Truncation and censorship are optionally used to treat outliers as missing values (described above) and/or replace extreme values with less extreme values. The invention uses percentile steps of, illustratively, 1%, 2%, 3%, 4%, 5%, etc. and 99%, 98%, 97%, 96% etc. to determine applicable cutoffs, though other steps may be used.

For a numerical analysis variable, one embodiment of the invention uses a method of maximum likelihood to create additional candidate variables from the creation of categories. The creation of categories is a step in the model building process for both of the algorithms described above.

For a continuous numerical analysis variable, the invention partitions variables into ordered categories of equal size. Within the context of the present invention, 100 ordered categories are usually sufficient, although a finer partition (i.e., more categories) is optionally used where data of sufficient volume is present. Missing values, if present, form a distinct category outside the 100 ordered categories and will be considered in the last step of the method.

For a discrete numerical analysis variable the process is similar, except that the "lumpiness" of the discrete variable may prevent the formation of 100 groups. For example, a discrete variable that has only three possible values would have only three possible categories.

For a categorical analysis variable with an a priori ordering the process is similar to that of a discrete numerical analysis variable. Furthermore, this variable is also analyzed as a variable without a priori ordering (as described further below).

For a categorical analysis variable that does not have an a priori ordering, such as a state of address, the invention orders the categories by the average value of the dependent variable in those categories.

For each N (N=1 to 100), the invention creates substantially all possible ordered groupings of the ordered categories. For example, if N=1, the group is the entire dataset. If N=2, the first possible grouping contains category 1 as group1 and category 2 thru 100 as group2. The second possible grouping contains category 1, 2 as group1 and category 3 thru 100 as group2. There are 99 possible groupings because the invention enforces a rule that the categories of a group must be adjacent to each other in the ordering. For N=3 there are 98*99/2 possible groupings, etc.

For N=1, the invention evaluates the maximum likelihood of a model that assigns the dependent variable average to all observations (except observations with missing values). For N=2 the invention evaluates the maximum likelihood of all 99 possible groupings of a model that assigns the dependent variable average for a group to all observations in that group. The "best" grouping is found. By mathematical necessity the N=2 statistic will improve upon the N=1 statistic. The maximum likelihood is calculated in accordance with the model. For example, the bivariate analysis when the dependent variable is dichotomous will typically use logistic regression.

The invention then compares the maximum likelihood for N=1 to the maximum likelihood for the best N=2 group. The N=2 statistic is penalized using, illustratively, the Schwartz-Bayes Criteria to see if the improvement is statistically significant. Alternative statistical penalties include the Akaike Information Criterion. If it is, then the invention will discard N=1 and will use the N=2 groupings to create categories.

The process then generates candidate variables that cover the created groups by using 0/1 indicators. In general N groups will create N−1 candidate variables. For example, if N=3 groups have been determined, 2 candidate variables will be created. The first candidate variable has the value 1 for group 1 and 0 for groups 2 and 3. The second candidate variable has the value 1 for groups 1 and 2 and 0 for group 3. If a distinct missing values group is present then that group may be assigned 0 or 1, depending on which assignment creates the more predictive candidate variable as measured by the likelihood statistic of the corresponding 1 variable model. There would also be a candidate variable that will have the value 0 for all groups with non missing values and 1 for the distinct missing group.

Continuous candidate variables with a wide range may be truncated from below (left) or above (right) of the distribution in order to improve the likelihood statistics of the variable.

Thus a set of candidate variables that take only numerical values will have been created that will be used to build the models for P(CCE) and/or EUL. Some of these candidate variables will be designated frontier variables whose presence in a model developed in step 240 may necessitate more iterations of the analysis variable creation process and a possible repeat of the model development process. The goal is to create a sufficiently large set of variables so that subsequent iterations of the analysis variable creation process would not generate new predictive variables that would significantly improve the model.

It is noted that the term "payment" as used herein is intended to be generally synonymous with the term "monetary."

Figure 3:
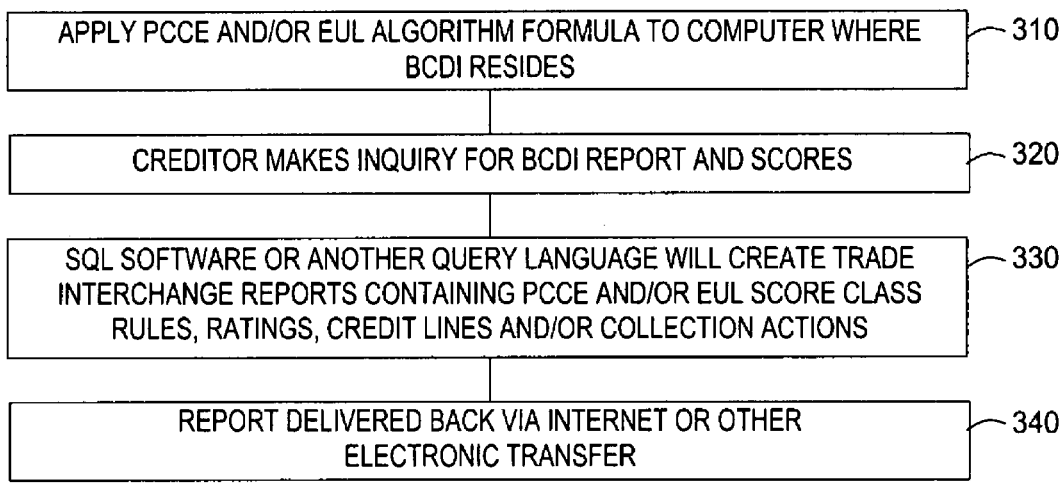
FIG. 3 depicts a flow diagram of a method for implementing a BCDI score.

FIG. 3 depicts a flow diagram of a method for implementing a BCDI score. Specifically, FIG. 3 depicts an implementation where the algorithm is sent to a computer hosting the BCDI. As will be discussed below, FIG. 3 depicts an implementation where the algorithm is sent to the computer of the algorithm holder.

At step 310, the P(CCE) and/or EUL algorithm formula is applied to a computer where the BCDI resides. That is, the method creates a paneled analytical data base (or uses a relational data base) that will allow the application of the P(CCE) and/or EUL formula and the development of Score Classes Ratings, Credit Lines and/or collection actions. This input data can be housed on site or can be delivered through the Internet or another type of networking.

At step 320, a creditor makes an inquiry for the BCDI report and scores. That is, with respect to production and delivery of the BCDI product, a Creditor makes an inquiry for a Business Credit Data Interchange Report via account number, debtor name and address or other unique key.

At step 330, SQL software or other query language software creates trade interchange reports containing P(CCE) and/or EUL score class rules, ratings, credit lines and/or collection actions and the like. That is, based upon the inquiry of step 320, SQL software or another query language will create the Trade Interchange Reports that include the P(CCE) and/or EUL formula, Score Class and Ratings that compare the debtor/creditor relationship with the debtor/BCDI relationship with respect to credit and collections.

At step 340, a report is delivered to the requesting creditor via the Internet or other electronic or non-electronic means. That is, in one embodiment the report is delivered back to the creditor via the Internet in HTTP, SHTTP, FTP, SFTP or e-mail formats, while in other embodiments a paper report may be sent via mail.

Figure 4:
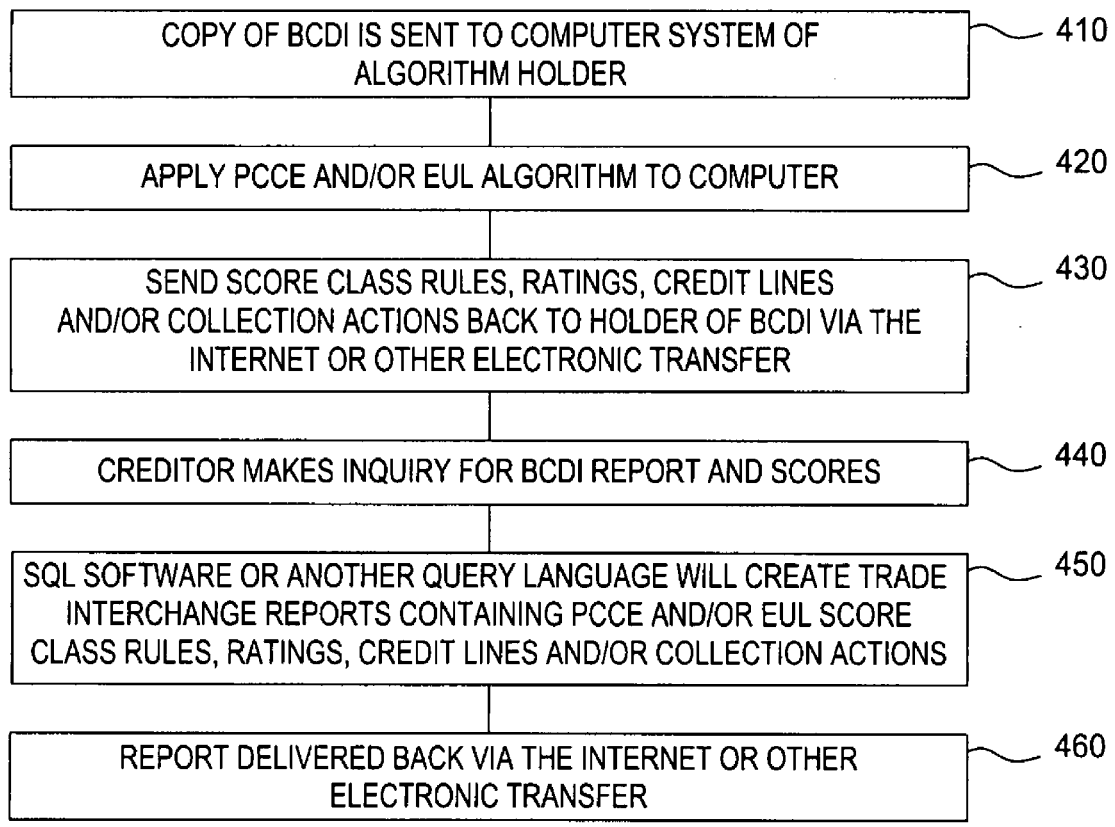
FIG. 4 depicts a flow diagram of an alternate method for implementing a BCDI score.

FIG. 4 depicts a flow diagram of an alternate method for implementing a BCDI score. Specifically, FIG. 4 depicts an implementation where the algorithm is sent to the computer of the algorithm holder.

At step 410, a copy of the BCDI is sent to a computer system associated with the algorithm holder.

At step 420, P(CCE) and/or EUL algorithm is applied to the receiving computer.

At step 430, the score class rules, ratings, credit lines and/or collection actions and PAR are sent back to the holder of the BCDI via the Internet or other electronic or non-electronic transfer means.

At step 440, a creditor makes an inquiry for BCDI report and scores.

At step 450, SQL software or other query language software creates trade interchange reports containing P(CCE) and/or EUL score class rules, ratings, credit lines and/or collection actions and the like.

At step 460, a report is delivered to the requesting creditor via the Internet or other electronic or non-electronic means.

Generally speaking, the present invention is adapted to provide credit and collection managers, in companies that offer trade, leasing, installment and other types of credit, the ability to compare the odds, or probability based score, of the CCE and/or EUL occurring for a given customer or debtor to the probability and/or financial consequence of this same event occurring with respect to other creditors that are doing business with the same customer or debtor. This information is useful to a creditor for determining whether the customer or debtor will pay one creditor better than, worse than or about the same as the customer or debtor's other creditors. The credit and collection managers of the creditor company can also use this information to develop and implement strategies for extending further credit and/or to ensure timely payment.

By utilizing the present invention, a creditor may compute comparisons of the probabilities of payment and/or EUL to determine where the creditor ranks within a hierarchy of payments associated with a particular debtor. The position of a particular creditor within the hierarchy of creditors associated with a particular debtor is indicative of the urgency or likelihood of the debtor to pay the particular creditor vis-à-vis the other creditors.

For example, within a commercial context a major company that a given customer must have as a supplier may not be aware that the customer is having problems paying bills to other companies because the major company is always paid on a timely basis, right up until the time the customer cannot pay anyone anymore. That is, since the major company is a critical supplier, the customer of the major company cannot risk a cut off of supply and, therefore, appropriately pays the major company until; for example, the customer goes out of business.

Figure 5:
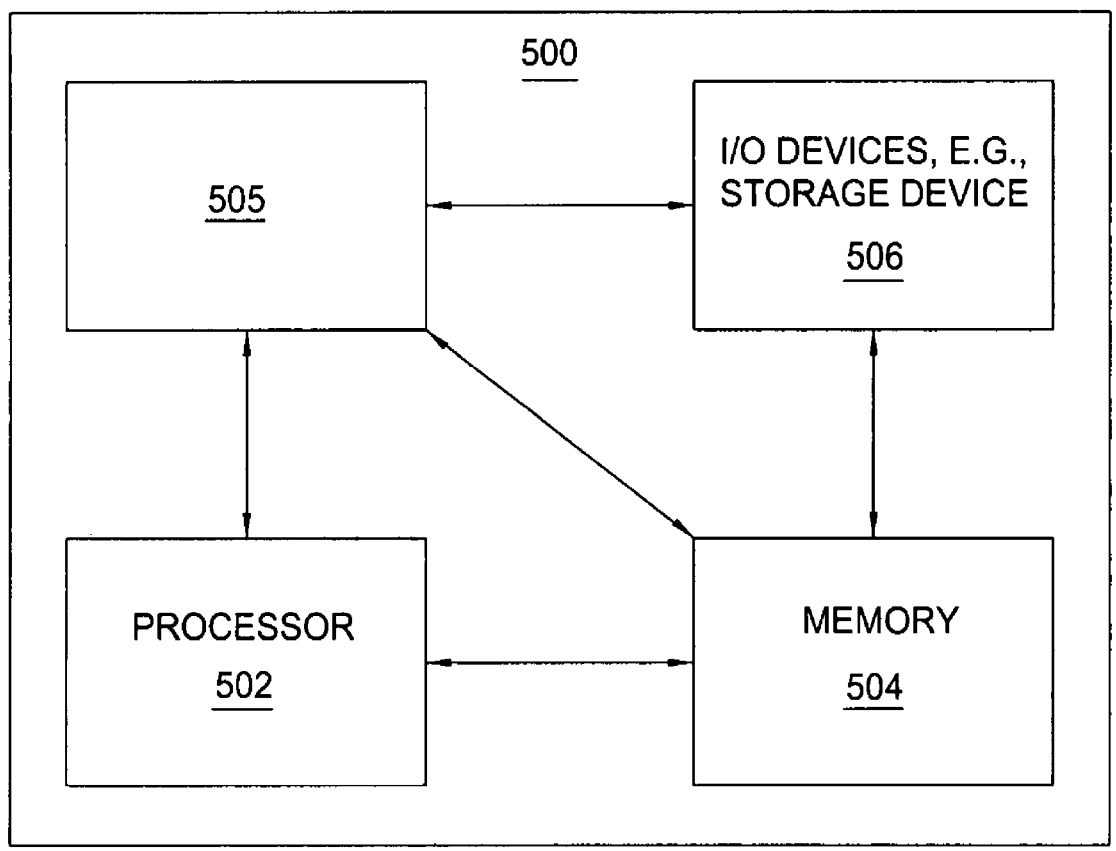
FIG. 5 depicts a high-level block diagram of a general-purpose computer suitable for use in performing the functions described herein.

FIG. 5 depicts a high-level block diagram of a general-purpose computer suitable for use in performing any of the functions described herein. As depicted in FIG. 5, system 500 comprises a processor element 502 (e.g., a CPU), a memory 504, e.g., random access memory (RAM) and/or read only memory (ROM), a performance monitoring module 405, and various input/output devices 406 (e.g., storage devices, including but not limited to, a tape drive, a floppy drive, an optical disk drive, hard disk drive or a compact disk drive, a receiver, a transmitter, a speaker, a display, an output port, and a user input device such as a keyboard, a keypad, a mouse, and the like).

It should be noted that the present invention may be implemented in software and/or in a combination of software and hardware, e.g., using application specific integrated circuits (ASIC), a general purpose computer or any other hardware equivalents. In one embodiment, the present performance monitoring process 405 can be loaded into memory 404 and executed by processor 402 to implement the functions as discussed above. As such, performance monitoring process 405 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory or mass storage associated with a computing device operating according to the instructions.

What is claimed is:

1. A non-transitory computer readable medium containing a program which, when executed by a processor, performs a method comprising:

aggregating at least one of account receivable data and payment data of a debtor (i) from each of a plurality of creditors (j); and using the aggregated debtor data and debtor data from the plurality of the creditors (j) determining a probability of a credit or collection event ($P(CCE_{ij})$) of the debtor (i) with respect to at least one creditor of the plurality of the creditors (j);

storing, in a memory, values corresponding to the ($P(CCE_{ij})$), wherein the $P(CCE_{ij})$ is determined according to the following model:

$P(CCE_{ij})$ is a function of ($AR_{ij}$, $APP_{ij}$, $OTHER_j$, $BCDI_{i1}$, $BCDI_{i2}$ ... $BCDI_{iJ}$); where ($AR_{ij}$) comprises accounts receivable data for debtor (i) with creditor (j); ($APP_{ij}$) comprises optional internal data for debtor (i) with creditor (j); ($OTHER_j$), comprises optional third party data on debtor (i) selected from at least one of a credit bureau, a demographic data source or a private data source; and ($BCDI_{ij}$) comprises Business Credit Data Interchange data elements for debtor (i) across all J creditors in the BCDI; and making a credit decision utilizing the stored values corresponding to the ($P(CCE_{ij})$).

2. A non-transitory computer readable medium containing a program which, when executed by a processor, performs a method comprising:

adapting a debtor score at a first creditor model in response to account receivable data and payment data of the debtor received from a second creditor model, each of the creditor models being generated according to respective Business Credit Data Interchange (BCDI) group, wherein the debtor score comprises a probability of a credit or collection event ($P(CCE_{ij})$) of the debtor (i) with respect to at least one creditor of a plurality of the creditors (j), wherein $P(CCE_{ij})$ is a function of $AR_{ij}$, $APP_{ij}$, $OTHER_j$, $BCDI_{j1}$, $BCDI_{j2}$ ..., $BCDI_{ij}$; where AR comprises accounts receivable data for debtor (i) with creditor ($APP_{ij}$) comprises optional internal data for debtor (i) with creditor (j); ($OTHER_j$) comprises optional third party data on debtor (i) selected from at least one of a credit bureau, a demographic data source or a private data source; and ($BCDI_{ij}$) comprises Business Credit Data Interchange data elements for debtor (i) across all J creditors in the BCDI;

storing, in a memory, values corresponding to the debtor score; and making a credit decision utilizing the stored values corresponding to the ($P(CCE_{ij})$).

3. The non-transitory computer readable claim 1, further comprising:

calculating an expected utility loss (EUL) of a debtor with respect to at least one creditor according to the following equation:

$$EULij = P(CCEij) * ULij; \text{ where}$$

utility loss (UL) is a function of one or more of balance outstanding and collection effort costs.

4. The non-transitory computer readable f claim 1, further comprising:

receiving a creditor inquiry regarding a particular debtor; and evaluating expected behavior of the particular debtor with respect to the inquiring creditor according to the P(CCE) data.

5. The non-transitory computer readable claim 4, further comprising:

providing to the inquiring creditor a report regarding the evaluation of the respective debtor.

6. The non-transitory computer readable claim 2, further comprising:

generating the account receivable data by performing a bivariate statistical analysis upon accounts receivable data elements within the BCDI group.

7. The non-transitory computer readable claim 6, further comprising:

applying one or more transformations to the account receivable data to create predictive variables, the one or more transformations comprising any of logs, truncations, censorings, variances, averages, measures of volatilities, compound variables, missing variable assignments and the creation of dichotomous variables.

8. The non-transitory computer readable claim 7, wherein:

said first creditor model is generated by processing candidate predictive variables in association with the dependent variables according to a selection technique.

9. The non-transitory computer readable f claim 8, wherein the selection technique comprises a stepwise selection technique having associated with it a complexity penalty.

10. The non-transitory computer readable claim 9, wherein the complexity penalty comprises a Schwartz Bayes Criterion.

11. The non-transitory computer readable claim 1, wherein the account receivable data further comprises amount 1-30 days past due across creditors.

12. The non-transitory computer readable claim 1, wherein the account receivable data further comprises total outstanding balance across creditors, amount past due across creditors, amount of write-off (loss) across creditors, amount placed for collection across creditors, and average days past due across creditors.

13. The non-transitory computer readable claim 2, wherein the respective BCDI groups includes data relating to an amount 1-30 days past due across creditors.

14. The non-transitory computer readable claim 2, wherein the respective BCDI groups includes further comprises data relating to total outstanding balance across creditors, amount past due across creditors, amount of write-off (loss) across creditors, amount placed for collection across creditors, and average days past due across creditors.

* * * * *